United States Patent
Sakamoto et al.

(10) Patent No.: US 11,961,960 B2
(45) Date of Patent: Apr. 16, 2024

(54) LITHIUM SECONDARY BATTERY

(71) Applicant: Nippon Telegraph and Telephone Corporation, Tokyo (JP)

(72) Inventors: Shuhei Sakamoto, Musashino (JP); Yoko Ono, Musashino (JP); Masahiko Hayashi, Musashino (JP); Takeshi Komatsu, Musashino (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 747 days.

(21) Appl. No.: 17/055,890

(22) PCT Filed: May 16, 2019

(86) PCT No.: PCT/JP2019/019510
§ 371 (c)(1),
(2) Date: Nov. 16, 2020

(87) PCT Pub. No.: WO2019/221233
PCT Pub. Date: Nov. 21, 2019

(65) Prior Publication Data
US 2021/0202979 A1    Jul. 1, 2021

(30) Foreign Application Priority Data
May 18, 2018 (JP) .................. 2018-096015

(51) Int. Cl.
*H01M 10/0525* (2010.01)
*H01M 10/056* (2010.01)

(52) U.S. Cl.
CPC ..... *H01M 10/0525* (2013.01); *H01M 10/056* (2013.01); *H01M 2300/0025* (2013.01); *H01M 2300/0068* (2013.01)

(58) Field of Classification Search
None
See application file for complete search history.

(56) References Cited

U.S. PATENT DOCUMENTS

2016/0308220 A1\* 10/2016 Qi ................ H01M 4/8647

FOREIGN PATENT DOCUMENTS

| JP | 2017004610 A | \* | 1/2017 |
| WO | 2018/016444 A1 | | 1/2018 |

OTHER PUBLICATIONS

English language machine translation of JP-2017004610-A. (Year: 2017).\*

(Continued)

*Primary Examiner* — Eli S Mekhlin
(74) *Attorney, Agent, or Firm* — Workman Nydegger

(57) ABSTRACT

Provided is a lithium secondary battery having a higher capacity and a longer life. The lithium secondary battery includes: a positive electrode including a material capable of intercalation and deintercalation of a lithium ion; a lithium ion-conductive electrolyte including a salen-based metal complex; and a negative electrode including a material capable of occlusion and release of a lithium metal or a lithium ion. The salen-based metal complex is selected from (R,R)-(−)-N,N'-bis(3,5-di-tert-butylsalicylidene)-1,2-cyclohexanediaminotitanium chloride (TiSl), VSl, CrSl, MnSl, FeSl, CoSl, and RuSl.

8 Claims, 2 Drawing Sheets

Salen-based metal complex (R,R)-(−)-N,N'-Bis(3,5-di-tert-butylsalicylidene)-1,2-cyclohexanediamino M(III) chloride M = Cr, Mn, Fe or Co (only Co has no Cl group)

(56) References Cited

OTHER PUBLICATIONS

International Search Report dated Aug. 20, 2019, issued in PCT Application No. PCT/JP2019/019510, filed May 16, 2019.
Ho Chul Shin et al., *Electrochemical Properties of the Carbon-Coated LiFePo$_4$ as a Cathode Material for Lithium-ion Secondary Batteries*, Journal of Power Sources, vol. 159, 2006, pp. 1383-1388.
M.X. Li et al., *A Dense Cellulose-Based Membrane as a Renewable Host for Gel Polymer Electrolyte of Lithium Ion Batteries*, Journal of Membrane Science, vol. 476, 2015, pp. 112-118.
Yutao Li et al., *Mastering the Interface for Advanced All-Solid-State Lithium Rechargeable Batteries*, PNAS, vol. 113, No. 47, Nov. 22, 2016, pp. 13313-13317.

* cited by examiner

Salen-based metal complex (R,R)-(-)-N,N'-Bis(3,5-di-tert-butylsalicylidene)-1,2-cyclohexanediamino M(III) chloride M = Cr, Mn, Fe or Co (only Co has no Cl group)

LITHIUM SECONDARY BATTERY

TECHNICAL FIELD

The present invention relates to a lithium secondary battery.

BACKGROUND ART

Lithium secondary batteries have high energy density and excellent charge-discharge cycle characteristics as compared with other rechargeable batteries such as rechargeable nickel-cadmium batteries and rechargeable nickel-hydrogen batteries, and as such, are widely utilized as power sources for increasingly downsized and thinner mobile electronic devices. Downsizing and thinning will be highly demanded in the future.

For example, downsizing and thinning are studied using various electrolytes such as organic electrolyte solutions, gel polymer electrolytes, and solid electrolytes. For example, Non-Patent Literature 1 discloses that a capacity of approximately 135 mAh/g is exhibited under conditions involving a current density of 15 mA/g using 1 mmol/l $LiPF_6$EC/DMC/EMC based on an organic solvent in an electrolyte, $LiFePO_4$ in a positive electrode, and Li in a counter electrode.

Non-Patent Literature 2 discloses that a capacity of approximately 110 mAh/g is exhibited under conditions involving a current density of 50 mA/g using a gel polymer electrolyte based on a hydroxyethylcellulose membrane in an electrolyte, $LiFePO_4$ in a positive electrode, and Li in a counter electrode.

Non-Patent Literature 3 discloses that a capacity of approximately 120 mAh/g is exhibited under conditions involving 80° C. and a current density of 100 µA/cm2 using a NASICON-type solid electrolyte which is $LiZr_2(PO_4)_3$ in an electrolyte, $LiFePO_4$ in a positive electrode, and Li in a counter electrode.

CITATION LIST

Non-Patent Literature

Non-Patent Literature 1: H. C. Shin, et al., "Electrochemical properties of the carbon-coated LiFePO4 as a cathode material for lithium-ion secondary batteries", J. Power Sources, 259, 1383-1388, (2006)

Non-Patent Literature 2: M. X. Li, et al., "A dense cellulose-based membrane as a renewable host for gel polymer electrolyte of lithium ion batteries", J. Member. Sci., 476, 112-118 (2015)

Non-Patent Literature 3: Y. Li, et al., "Mastering the interface for advanced all-solid-state lithium rechargeable batteries", Proc. Natl. Acad. Sci. USA, 113, 13313-13317 (2016)

SUMMARY OF THE INVENTION

Technical Problem

However, a problem of the lithium secondary batteries disclosed in Non-Patent Literatures 1 to 3 is a smaller capacity than a theoretical capacity of 169 mAh/g of a positive-electrode active material due to large resistance at an electrode (positive electrode)-electrolyte interface.

The present invention has been made in light of this problem, and an object of the present invention is to provide a lithium secondary battery having a higher capacity and a longer life.

Means for Solving the Problem

In summary, the lithium secondary battery according to one mode of the present embodiment comprises: a positive electrode comprising a material capable of intercalation and deintercalation of a lithium ion; a lithium ion-conductive electrolyte comprising a salen-based metal complex; and a negative electrode comprising a material capable of occlusion and release of a lithium metal or a lithium ion.

Effects of the Invention

The present invention can provide a lithium secondary battery having a higher capacity and a longer life by adding a salen-based metal complex to an electrolyte.

DESCRIPTION OF EMBODIMENTS

Hereinafter, the embodiments of the present invention will be described with reference to the drawings.

Configuration of Lithium Secondary Battery

Figure 1:
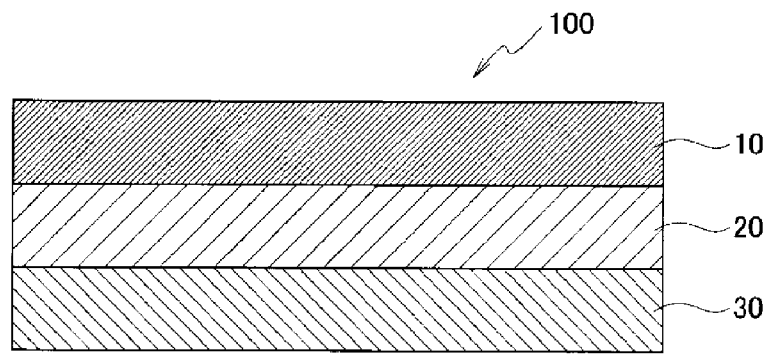
FIG. 1 is a diagrammatic cross-sectional view schematically showing the basic configuration of the lithium secondary battery according to an embodiment of the present invention.

FIG. 1 is a diagrammatic cross-sectional view showing the basic configuration of the lithium secondary battery according to the present embodiment. As shown in this drawing, the basic configuration of a lithium secondary battery 100 has a positive electrode 10, an electrolyte 20, and a negative electrode 30 and is the same as that of general lithium secondary batteries.

A feature of the lithium secondary battery according to the present embodiment is to comprise a salen-based metal complex as an additive in the electrolyte 20.

The positive electrode 10 can comprise a catalyst and an electroconductive material as components. Also, the positive electrode 10 preferably comprises a binder for integrating the catalyst and the electroconductive material.

The negative electrode 30 can comprise metallic lithium or a substance, such as a lithium-containing alloy, carbon, or an oxide, which can release and absorb lithium ions, as a component.

Hereinafter, each component of the lithium secondary battery 100 of the present embodiment will be described.

(I) Electrolyte

Figure 2:
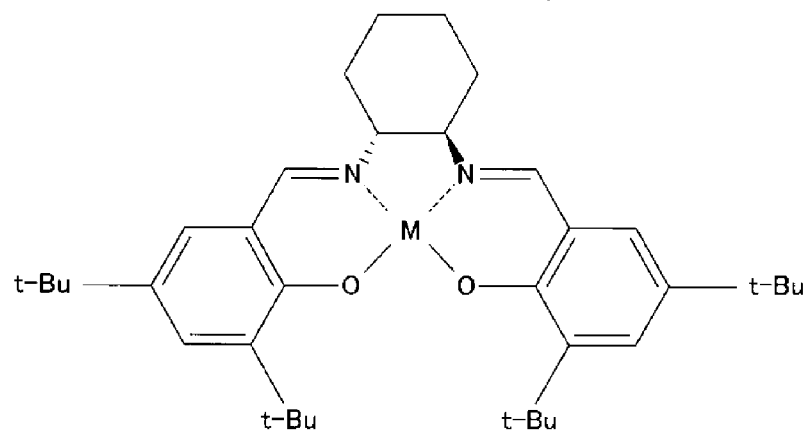
FIG. 2 is a diagram showing the structural formula of a salen-based metal complex.

The electrolyte 20 of the lithium secondary battery 100 according to the present embodiment exhibits lithium ion conductivity and comprises a salen-based metal complex as an additive. FIG. 2 shows the structural formula of a salen-based metal complex.

The salen-based metal complex is preferably selected from (R,R)-(−)-N,N'-bis(3,5-di-tert-butylsalicylidene)-1,2-cyclohexanediaminotitanium chloride (TiSl), (R,R)-(−)-N,N'-bis(3,5-di-tert-butylsalicylidene)-1,2-cyclohexanediaminovanadium chloride (VSl), (R,R)-(−)-N,N'-bis(3,5-di-tert-butylsalicylidene)-1,2-cyclohexanediaminochromium chloride (CrSl), (R,R)-(−)-N,N'-bis(3,5-di-tert-butylsalicylidene)-1,2-cyclohexanediaminomanganese chloride (MnSl), (R,R)-(−)-N,N'-bis(3,5-di-tert-butylsalicylidene)-1,2-cyclohexanediaminoiron chloride (FeSl), (R,R)-(−)-N,N'-bis(3,5-di-tert-butylsalicylidene)-1,2-cyclohexanediaminocobalt chloride (CoSl), and (R,R)-(−)-N,N'-bis(3,5-di-tert-butylsalicylidene)-1,2-cyclohexanediaminoruthenium chloride (RuSl).

The additive may be selected as one type of those described above, or a mixture of two or more types thereof may be used. The mixing ratio of the mixture is not particularly limited. The mixing ratio may be any ratio.

The electrolyte 20 comprises a Li salt together with the salen-based metal complex described above. The Li salt is supplied from a metal salt comprising lithium. Specific examples of the metal salt can include solute metal salts such as lithium hexafluorophosphate ($LiPF_6$), lithium perchlorate ($LiClO_4$), and lithium trifluoromethanesulfonylamide (LiTFSA) [$(CF_3SO_2)_2NLi$].

The electrolyte 20 also comprises a solvent. Examples of the solvent can include: carbonic acid ester-based solvents such as dimethyl carbonate (DMC), methylethyl carbonate (MEC), methylpropyl carbonate (MPC), methylisopropyl carbonate (MIPC), methylbutyl carbonate (MBC), diethyl carbonate (DEC), ethylpropyl carbonate (EPC), ethylisopropyl carbonate (EIPC), ethylbutyl carbonate (EBC), dipropyl carbonate (DPC), diisopropyl carbonate (DIPC), dibutyl carbonate (DBC), ethylene carbonate (EC), propylene carbonate (PC), and 1,2-butylene carbonate (1,2-BC); ether-based solvents such as 1,2-dimethoxyethane (DME), diethylene glycol dimethyl ether, triethylene glycol dimethyl ether, and tetraethylene glycol dimethyl ether; and lactone-based solvents such as γ-butyrolactone (GBL); and mixed solvents of two or more types of these solvents. In the present embodiment, the mixing ratio of the mixed solvent is not particularly limited.

The electrolyte 20 may also comprise a gel polymer. For example, one of polyvinylidene fluoride (PVdF)-, polyacrylonitrile (PAN)-, and polyethylene oxide (PEO)-based gel polymers, or a mixed gel polymer of two or more types of these gel polymers may be used as the gel polymer. The mixing ratio of the mixed gel polymer is not particularly limited.

The electrolyte 20 may also comprise a solid electrolyte. Examples of the solid electrolyte include: oxide solid electrolytes having a β eucryptite structure of $LiAlSiO_4$, a ramsdellite structure of $Li_2Ti_3O_7$, a trirutile structure of $LiNb_{0.75}Ta_{0.25}WO_6$, $Li_{14}ZnGe_4O_{16}$, a γ-$Li_3PO_4$ structure of $Li_{3.6}Ge_{0.6}V_{0.4}O_4$, an antifluorite structure of $Li_{5.5}Fe_{0.5}Zn_{0.5}O_4$, NASICON type of $Li_{1.3}Ti_{1.7}Al_{0.3}(PO_4)_3$, a β-$Fe_2(SO_4)_3$ structure of $Li_3Sc_{0.9}Zr_{0.1}(PO_4)_3$, a perovskite structure of $La_{2/3-x}Li_{3x}TiO_3$ (x≠0.1), or a garnet structure of $Li_7a_3Zr_2O_{12}$; and sulfide solid electrolytes having the thio-LISICON substance group of Li4GeS4, Li4-xGe1-xPxS4, Li4-3xAlxGeS4, and Li3+5xP1-xS4.

(II) Positive Electrode

The positive electrode 10 of the lithium secondary battery 100 according to the present embodiment comprises an electroconductive material capable of intercalation and deintercalation of a lithium ion, and optionally comprises both or one of a catalyst and a binder.

(II-1) Electroconductive Material

The electroconductive material comprised in the positive electrode 10 is preferably carbon. Examples thereof can include carbon blacks such as ketjen black and acetylene black, activated carbons, graphites, carbon fibers, carbon sheets, and carbon cloths.

(II-2) Positive Electrode Material

Examples of the positive electrode material of the positive electrode 10 can include bedded salt-type materials such as LiCoO2 and LiNiO2, spinel-type materials such as LiMn2O4, and olivine-type materials such as LiFePO4. Other known positive electrode materials may be used without particular limitations.

Specifically, $LiNi(CoAl)O_2$, $LiNi_{1/3}Mn_{1/3}Co_{1/3}O_2$, $LiNi_{0.5}Mn_{0.5}O_2$, $Li_2MnO_3$—$LiMO_2$ (M=Co, Ni, or Mn), $Li_{1+x}Mn_{2-x}O_4$, $Li(MnAl)_2O_4$, $LiMn_{1.5}Ni_{0.5}O_4$, $LiMnPO_4$, $Li_2MSiO_4$, and $Li_2MPO_4F$, etc. can be used. These positive electrode materials can be synthesized by use of a known process such as a solid-phase method or a liquid-phase method.

(II-3) Binder

The positive electrode 10 may comprise a binder. Examples of the binder can include, but are not particularly limited to, polytetrafluoroethylene (PTFE), polyvinylidene fluoride (PVDF), and polybutadiene rubber. These binders can be used as a powder or as a dispersion.

The electroconductive material content in the positive electrode 10 is desirably, for example, less than 100% by weight, with respect to the weight of the positive electrode 10. The proportions of the other components are the same as those of conventional lithium secondary batteries.

(II-4) Production of Positive Electrode

The positive electrode 10 is produced as described below.

An oxide powder serving as a positive electrode material, a carbon powder, and a binder powder such as polyvinylidene fluoride (PVDF) are mixed in predetermined amounts. This mixture is pressure-bonded onto a current collector to form the positive electrode 10. Alternatively, the mixture may be dispersed in a solvent such as an organic solvent to prepare slurry, and this mixture in a slurry form can be applied onto a current collector and dried to form the positive electrode 10. In order to enhance the strength of the electrode and to prevent the leakage of the electrolyte solution, not only cold pressing but hot pressing may be applied thereto. More stable positive electrode 10 can be produced.

Alternatively, the positive electrode 10 may be produced by the vapor deposition of the positive electrode material onto a current collector using a film formation method such as RF (radio frequency) sputtering.

Examples of the current collector include metals such as metal foils and metal meshes, carbons such as carbon cloths and carbon sheets, and oxide membranes such as ITO (indium tin oxide) composed of indium oxide supplemented with tin oxide and ATO (Sb-doped tin oxide) composed of tin oxide doped with antimony.

(III) Negative Electrode

The negative electrode 30 of the lithium secondary battery 100 according to the present embodiment comprises a negative electrode material. This negative electrode material is not particularly limited as long as the material can be used in a negative electrode for lithium secondary batteries. Examples thereof can include metallic lithium.

The negative electrode 30 can be formed by a known method. In the case of using, for example, lithium metal, in the negative electrode, a plurality of metallic lithium foils can be layered and formed into a negative electrode having a predetermined shape.

(IV) Other Factors

The lithium secondary battery 100 according to the present embodiment comprises structural members such as a separator, a battery case, and a metal mesh, and other factors required for lithium secondary batteries, in addition to the components described above.

(V) Production of Lithium Secondary Battery

Figure 3:
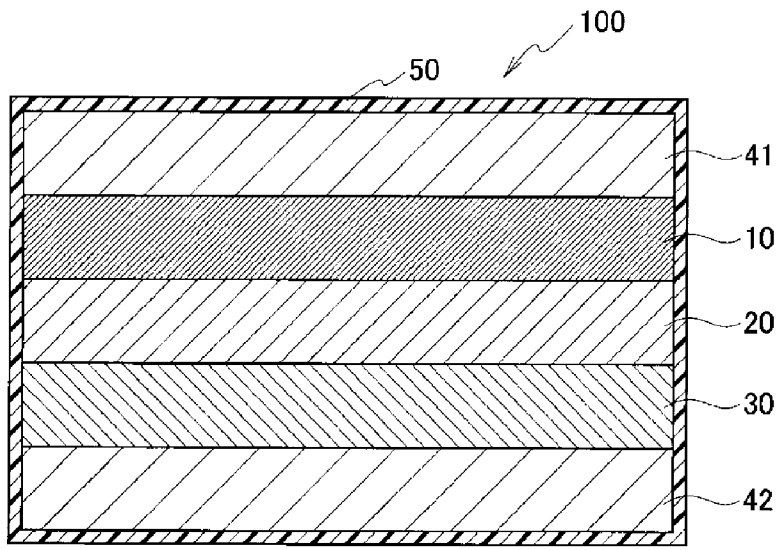
FIG. 3 is a cross-sectional view schematically showing the configuration of the lithium secondary battery according to an embodiment of the present invention.

FIG. 3 is a cross-sectional view schematically showing the configuration of the lithium secondary battery 100 according to the present embodiment. A method for producing the lithium secondary battery will be described with reference to FIG. 3.

As mentioned in the section (II-4) Production of positive electrode, a positive electrode 10 is fixed onto a current collector 41. As mentioned in the section (III), a negative electrode 30 is fixed onto a current collector 42.

Next, an electrolyte 20 mentioned in the section (I) is placed between the positive electrode 10 and the negative electrode 30. Then, the structure flanked by the current collector 41 and the current collector 42 is encapsulated using, for example, a housing 50 such as a laminate, in no contact with the atmosphere to produce the lithium secondary battery 100.

A member such as a separator is placed between the positive electrode 10 and the negative electrode 30, though omitted in FIG. 3. In addition, an insulating member and a fixture, etc. are appropriately placed according to a purpose to prepare the lithium secondary battery 100.

EXPERIMENT

For the purpose of confirming the effects of the present embodiment mentioned above, the lithium secondary battery 100 was produced by varying the composition of the electrolyte 20, and an experiment was conducted to evaluate its characteristics. The experimental conditions will be mentioned later. The lithium secondary battery 100 having each composition of the electrolyte 20 was evaluated for its characteristics by the cycle test of the battery.

(Cycle Test of Battery)

For the cycle test of the battery, current was applied to the battery at a current density of 1 mA/cm$^2$ per area of the positive electrode 10 using a charge-discharge measurement system (manufactured by Bio-Logic Science Instruments Ltd.), and charge voltage was measured until the battery voltage elevated to 4.0 V from open-circuit voltage. The discharge test of the battery was conducted until the battery voltage decreased to 2.5 V at the same current density as that at the time of charge. The charge-discharge test of the battery was conducted in an ordinary living environment. The charge-discharge capacity was indicated by a value (mAh/g) per weight of the positive electrode material.

Experimental Example 1

Electrolyte 20 of lithium secondary battery 100 of Experimental Example 1 comprises (R,R)-(−)-N,N'-bis(3,5-di-tert-butylsalicylidene)-1,2-cyclohexanediaminotitanium chloride (TiSl).

TiSl was obtained by mixing (R,R)-(−)-N,N'-bis(3,5-di-tert-butylsalicylidene)-1,2-cyclohexanediamine (manufactured by Sigma-Aldrich Co. LLC) and titanium chloride (manufactured by Wako Pure Chemical Industries, Ltd.) in ethanol.

TiSl was mixed into the organic electrolyte solution. For mixing, dispersion for 10 minutes was performed using an ultrasonic washing machine at the maximum output. The organic electrolyte solution used was a solution of LiPF$_6$ dissolved at a concentration of 1 mol/l in an organic solvent EC:DMC (volume ratio: 1:1). This organic electrolyte solution was mixed with 50 mmol/l TiSl to obtain a TiSl-containing electrolyte.

Then, a cell of the lithium secondary battery was produced by the following procedures.

Slurry of LiFePO4:acetylene black:PVdF=85:10:5 (weight ratio) was prepared, applied onto an Al foil, and dried to obtain a positive electrode 10. The lithium secondary battery cell was assembled in dry air having a dew point of −60° C. or lower.

COMPARATIVE EXAMPLE

A lithium secondary battery cell was produced in the same way as in Example 1 using 1 mol/l LiPF6 in EC:DMC (volume ratio: 1:1) as an organic electrolyte solution containing a solid electrolyte serving as an electrolyte of a lithium secondary battery to be compared with Experimental Examples according to the present embodiment.

(Discharge Characteristics)

Figure 4:
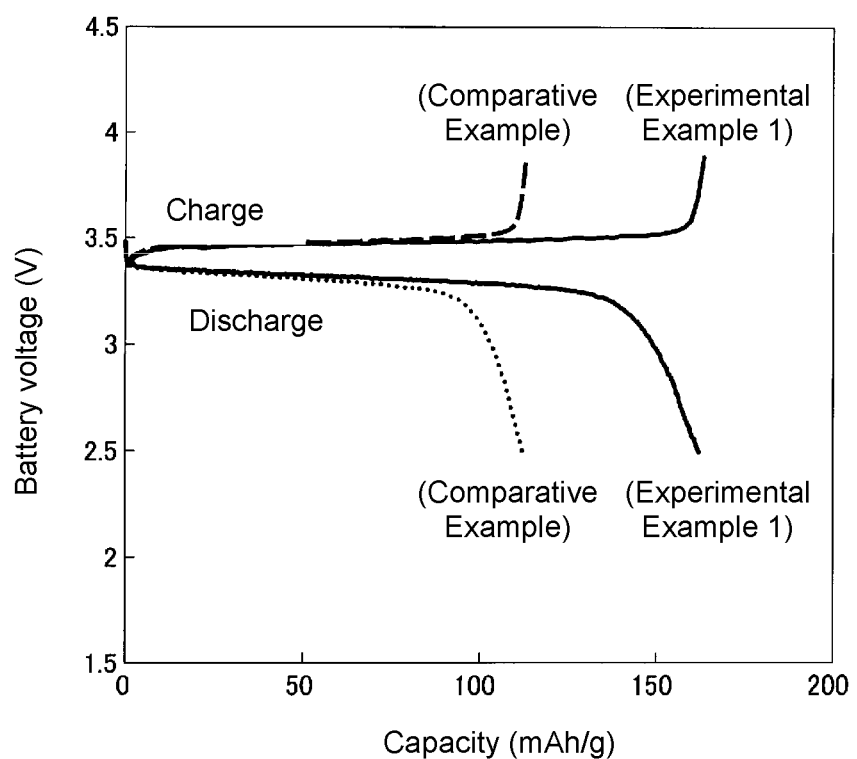
FIG. 4 is a diagram showing the charge-discharge characteristics of lithium secondary batteries of Experimental Example 1 and Comparative Example.

FIG. 4 shows the charge-discharge characteristics of the lithium secondary batteries of Experimental Example 1 and Comparative Example. The abscissa of FIG. 4 depicts capacity (mAh/g), and the ordinate thereof depicts battery voltage (V).

The initial discharge capacity of Experimental Example 1 was 162 mAh/g. The capacity retention at the 100th cycle of Experimental Example 1 was 98%. The initial discharge capacity and the discharge capacity retention are shown in Table 1.

The initial discharge capacity of Comparative Example exhibited 112 mAh/g. The capacity retention at the 100th cycle was 62%.

Thus, the lithium secondary battery using the TiSl-containing electrolyte was able to be confirmed to improve battery characteristics. Hereinafter, other experimental conditions for evaluating characteristics will be given.

Experimental Example 2

Electrolyte 20 of lithium secondary battery 100 of Experimental Example 2 was produced by mixing TiSl obtained by the same procedures as in Experimental Example 1 at a ratio of 30 wt % (with respect to the weight of an electrolyte) with a gel polymer electrolyte. A membrane of the gel polymer was produced by dissolving hydroxyethylcellulose (manufactured by Sigma-Aldrich Co., LLC) in water, followed by heating and vacuum drying treatment.

The obtained membrane of the gel polymer was impregnated with the same organic electrolyte solution as that of Experimental Example 1 to produce electrolyte 20. The initial discharge capacity of Experimental Example 2 was 158 mAh/g, and the discharge capacity retention was 96%. The respective evaluation results of Experimental Examples are summarized in Table 1 shown later.

Experimental Example 3

Electrolyte 20 of lithium secondary battery 100 of Experimental Example 3 was produced by mixing TiSl obtained by the same procedures as in Experimental Example 1 at a ratio of 30 wt % (with respect to the weight of an electrolyte) with a solid electrolyte. The solid electrolyte was produced by mixing $Li_2S$ (manufactured by Wako Pure Chemical Industries, Ltd.), $GeS_2$ (manufactured by Wako Pure Chemical Industries, Ltd.), and $P_2S_5$ (manufactured by Sigma-Aldrich Co. LLC) in a glove box, followed by heating treatment at 700° C. for 8 hours.

The initial discharge capacity of Experimental Example 3 was 155 mAh/g, and the discharge capacity retention was 91%.

Experimental Example 4

Electrolyte 20 of lithium secondary battery 100 of Experimental Example 4 comprises (R,R)-(−)-N,N'-bis(3,5-di-tert-butylsalicylidene)-1,2-cyclohexanediaminovanadium chloride (VSl).

VSl was obtained by mixing (R,R)-(−)-N,N'-bis(3,5-di-tert-butylsalicylidene)-1,2-cyclohexanediamine (manufactured by Sigma-Aldrich Co. LLC) and vanadium chloride (manufactured by Wako Pure Chemical Industries, Ltd.) in ethanol.

The initial discharge capacity of Experimental Example 4 was 168 mAh/g, and the discharge capacity retention was 98%.

Experimental Example 5

Electrolyte 20 of lithium secondary battery 100 of Experimental Example 5 was produced by mixing VSl obtained by the same procedures as in Experimental Example 4 at a ratio of 30 wt % (with respect to the weight of an electrolyte) with a gel polymer electrolyte. Experimental Example 5 differed only in the type of the additive (VSl) from Experimental Example 2 (TiSl).

The initial discharge capacity of Experimental Example 5 was 158 mAh/g, and the discharge capacity retention was 94%.

Experimental Example 6

Electrolyte 20 of lithium secondary battery 100 of Experimental Example 6 was produced by mixing VSl obtained by the same procedures as in Experimental Example 4 at a ratio of 30 wt % (with respect to the weight of an electrolyte) with a solid electrolyte. Experimental Example 6 differed only in the type of the additive (VSl) from Experimental Example 3 (TiSl).

The initial discharge capacity of Experimental Example 6 was 158 mAh/g, and the discharge capacity retention was 91%.

Experimental Example 7

Electrolyte 20 of lithium secondary battery 100 of Experimental Example 7 comprises (R,R)-(−)-N,N'-bis(3,5-di-tert-butylsalicylidene)-1,2-cyclohexanediaminochromium chloride (CrSl).

CrSl was obtained by mixing (R,R)-(−)-N,N'-bis(3,5-di-tert-butylsalicylidene)-1,2-cyclohexanediamine (manufactured by Sigma-Aldrich Co. LLC) and chromium chloride (manufactured by Wako Pure Chemical Industries, Ltd.) in ethanol.

CrSl was mixed into an organic electrolyte solution by the same procedures as in Experimental Example 1. Experimental Example 7 differed only in the type of the additive (CrSl) from Experimental Examples 1 and 4.

The initial discharge capacity of Experimental Example 7 was 168 mAh/g, and the discharge capacity retention was 97%.

Experimental Example 8

Electrolyte 20 of lithium secondary battery 100 of Experimental Example 8 was produced by mixing CrSl obtained by the same procedures as in Experimental Example 7 at a ratio of 30 wt % (with respect to the weight of an electrolyte) with a gel polymer electrolyte. Experimental Example 8 differed only in the type of the additive (CrSl) from Experimental Examples 2 and 5.

The initial discharge capacity of Experimental Example 8 was 162 mAh/g, and the discharge capacity retention was 97%.

Experimental Example 9

Electrolyte 20 of lithium secondary battery 100 of Experimental Example 9 was produced by mixing CrSl obtained by the same procedures as in Experimental Example 7 at a ratio of 30 wt % (with respect to the weight of an electrolyte) with a solid electrolyte. Experimental Example 9 differed only in the type of the additive (CrSl) from Experimental Examples 3 and 6.

The initial discharge capacity of Experimental Example 9 was 158 mAh/g, and the discharge capacity retention was 96%.

Experimental Example 10

Electrolyte 20 of lithium secondary battery 100 of Experimental Example 10 comprises (R,R)-(−)-N,N'-bis(3,5-di-tert-butylsalicylidene)-1,2-cyclohexanediaminomanganese chloride (MnSl).

MnSl was obtained by mixing R,R)-(−)-N,N'-bis(3,5-di-tert-butylsalicylidene)-1,2-cyclohexanediamine (manufactured by Sigma-Aldrich Co. LLC) and manganese chloride (manufactured by Wako Pure Chemical Industries, Ltd.) in ethanol.

Experimental Example 10 differed only in the type of the additive (MnSl) from Experimental Examples 1, 4 and 7. The initial discharge capacity of Experimental Example 10 was 168 mAh/g, and the discharge capacity retention was 94%.

Experimental Example 11

Electrolyte 20 of lithium secondary battery 100 of Experimental Example 11 was produced by mixing MnSl obtained by the same procedures as in Experimental Example 10 at a ratio of 30 wt % (with respect to the weight of an electrolyte) with a gel polymer electrolyte.

Experimental Example 11 differed only in the type of the additive (MnSl) from Experimental Examples 2, 5 and 8. The initial discharge capacity of Experimental Example 11 was 168 mAh/g, and the discharge capacity retention was 92%.

Experimental Example 12

Electrolyte 20 of lithium secondary battery 100 of Experimental Example 12 was produced by mixing MnSl obtained by the same procedures as in Experimental Example 10 at a ratio of 30 wt % (with respect to the weight of an electrolyte) with a solid electrolyte.

Experimental Example 12 differed only in the type of the additive (MnSl) from Experimental Examples 3, 6 and 9. The initial discharge capacity of Experimental Example 12 was 165 mAh/g, and the discharge capacity retention was 90%.

Experimental Example 13

Electrolyte 20 of lithium secondary battery 100 of Experimental Example 13 comprises (R,R)-(−)-N,N'-bis(3,5-di-tert-butylsalicylidene)-1,2-cyclohexanediaminoiron chloride (FeSl).

FeSl was obtained by mixing (R,R)-(−)-N,N'-bis(3,5-di-tert-butylsalicylidene)-1,2-cyclohexanediamine (manufactured by Sigma-Aldrich Co. LLC) and iron chloride (manufactured by Wako Pure Chemical Industries, Ltd.) in ethanol.

FeSl was mixed into an organic electrolyte solution by the same procedures as in Experimental Example 1. Experimental Example 13 differed only in the type of the additive (FeSl) from Experimental Examples 1, 4, 7 and 10. The initial discharge capacity of Experimental Example 13 was 165 mAh/g, and the discharge capacity retention was 98%.

Experimental Example 14

Electrolyte 20 of lithium secondary battery 100 of Experimental Example 14 was produced by mixing FeSl obtained by the same procedures as in Experimental Example 13 at a ratio of 30 wt % (with respect to the weight of an electrolyte) with a gel polymer electrolyte. Experimental Example 14 differed only in the type of the additive (FeSl) from Experimental Examples 2, 5, 8 and 11.

The initial discharge capacity of Experimental Example 14 was 157 mAh/g, and the discharge capacity retention was 97%.

Experimental Example 15

Electrolyte 20 of lithium secondary battery 100 of Experimental Example 15 was produced by mixing FeSl obtained by the same procedures as in Experimental Example 13 at a ratio of 30 wt % (with respect to the weight of an electrolyte) with a solid electrolyte. Experimental Example 15 differed only in the type of the additive (FeSl) from Experimental Examples 3, 6, 9 and 12.

The initial discharge capacity of Experimental Example 15 was 156 mAh/g, and the discharge capacity retention was 94%.

Experimental Example 16

Electrolyte 20 of lithium secondary battery 100 of Experimental Example 16 comprises (R,R)-(−)-N,N'-bis(3,5-di-tert-butylsalicylidene)-1,2-cyclohexanediaminocobalt (CoSl).

CoSl was obtained by mixing (R,R)-(−)-N,N'-bis(3,5-di-tert-butylsalicylidene)-1,2-cyclohexanediamine (manufactured by Sigma-Aldrich Co. LLC) and cobalt chloride (manufactured by Wako Pure Chemical Industries, Ltd.) in ethanol.

CoSl was mixed into an organic electrolyte solution by the same procedures as in Experimental Example 1. Experimental Example 16 differed only in the type of the additive (CoSl) from Experimental Examples 1, 4, 7 and 10. The initial discharge capacity of Experimental Example 16 was 159 mAh/g, and the discharge capacity retention was 99%.

Experimental Example 17

Electrolyte 20 of lithium secondary battery 100 of Experimental Example 17 was produced by mixing CoSl obtained by the same procedures as in Experimental Example 16 at a ratio of 30 wt % (with respect to the weight of an electrolyte) with a gel polymer electrolyte. Experimental Example 17 differed only in the type of the additive (CoSl) from Experimental Examples 2, 5, 8 and 11.

The initial discharge capacity of Experimental Example 17 was 158 mAh/g, and the discharge capacity retention was 91%.

Experimental Example 18

Electrolyte 20 of lithium secondary battery 100 of Experimental Example 18 was produced by mixing CoSl obtained by the same procedures as in Experimental Example 16 at a ratio of 30 wt % (with respect to the weight of an electrolyte) with a solid electrolyte. Experimental Example 18 differed only in the type of the additive (CoSl) from Experimental Examples 3, 6, 9, 12 and 15. The initial discharge capacity of Experimental Example 18 was 156 mAh/g, and the discharge capacity retention was 91%.

Experimental Example 19

Electrolyte 20 of lithium secondary battery 100 of Experimental Example 16 comprises (R,R)-(−)-N,N'-bis(3,5-di-tert-butylsalicylidene)-1,2-cyclohexanediaminoruthenium chloride (RuSl). RuSl was obtained by mixing (R,R)-(−)-N,N'-bis(3,5-di-tert-butylsalicylidene)-1,2-cyclohexanediamine (manufactured by Sigma-Aldrich Co. LLC) and ruthenium chloride (manufactured by Wako Pure Chemical Industries, Ltd.) in ethanol.

RuSl was mixed into an organic electrolyte solution by the same procedures as in Experimental Example 1. Experimental Example 19 differed only in the type of the additive (RuSl) from Experimental Examples 1, 4, 7, 10, 13 and 16. The initial discharge capacity of Experimental Example 19 was 164 mAh/g, and the discharge capacity retention was 99%.

Experimental Example 20

Electrolyte 20 of lithium secondary battery 100 of Experimental Example 20 was produced by mixing RuSl obtained by the same procedures as in Experimental Example 19 at a ratio of 30 wt % (with respect to the weight of an electrolyte) with a gel polymer electrolyte. Experimental Example 20 differed only in the type of the additive (RuSl) from Experimental Examples 2, 5, 8, 11, 14 and 17.

The initial discharge capacity of Experimental Example 20 was 164 mAh/g, and the discharge capacity retention was 94%.

Experimental Example 21

Electrolyte 20 of lithium secondary battery 100 of Experimental Example 21 was produced by mixing RuSl obtained by the same procedures as in Experimental Example 19 at a ratio of 30 wt % (with respect to the weight of an electrolyte) with a solid electrolyte. Experimental Example 21 differed only in the type of the additive (RuSl) from Experimental Examples 3, 6, 9, 12, 15 and 18. The initial discharge capacity of Experimental Example 21 was 161 mAh/g, and the discharge capacity retention was 90%.

TABLE 1

| Experimental Example | Type of additive | Electrolyte | Initial discharge capacity (mAh/g) | Discharge capacity retention (%) |
|---|---|---|---|---|
| 1 | TiSl | Organic electrolyte solution | 162 | 98.0 |
| 2 | | Gel polymer electrolyte | 158 | 96.0 |
| 3 | | Solid electrolyte | 155 | 91.0 |
| 4 | VSl | Organic electrolyte solution | 168 | 98.0 |
| 5 | | Gel polymer electrolyte | 158 | 94.0 |
| 6 | | Solid electrolyte | 158 | 91.0 |
| 7 | CrSl | Organic electrolyte solution | 168 | 97.0 |
| 8 | | Gel polymer electrolyte | 162 | 97.0 |
| 9 | | Solid electrolyte | 158 | 96.0 |
| 10 | MnSl | Organic electrolyte solution | 168 | 94.0 |
| 11 | | Gel polymer electrolyte | 168 | 92.0 |
| 12 | | Solid electrolyte | 165 | 90.0 |
| 13 | FeSl | Organic electrolyte solution | 165 | 98.0 |
| 14 | | Gel polymer electrolyte | 157 | 97.0 |
| 15 | | Solid electrolyte | 156 | 94.0 |
| 16 | CoSl | Organic electrolyte solution | 159 | 99.0 |
| 17 | | Gel polymer electrolyte | 158 | 91.0 |
| 18 | | Solid electrolyte | 156 | 91.0 |
| 19 | RuSl | Organic electrolyte solution | 164 | 99.0 |
| 20 | | Gel polymer electrolyte | 164 | 94.0 |
| 21 | | Solid electrolyte | 161 | 90.0 |
| Comparative Example | Not added | Organic electrolyte solution | 112 | 62.0 |

As shown in Table 1, the lithium secondary battery using the electrolyte 20 supplemented with the salen-based metal complex was able to be confirmed to have a larger capacity and a higher discharge capacity retention at the 100th cycle than those of Comparative Example. From these results, the salen-based metal complex was confirmed to be effective as an additive in an electrolyte for lithium secondary batteries.

From the results of Experimental Examples 1, 4, 7, 10, 13, 16 and 19, the salen-based metal complex is preferably added at a ratio of 50 mmol/l or less (1.0 to 50 mmol/l) with respect to the volume of the organic electrolyte solution to the organic electrolyte solution. From the results of Experimental Examples 2, 3, etc., the salen-based metal complex is preferably added at a ratio of 30 wt % or less (1.0 to 30 wt %) with respect to the weight of the electrolyte to the gel polymer electrolyte or the solid electrolyte.

The initial discharge capacity of Experimental Examples was 161 mAh/g on average, and the discharge capacity retention of Experimental Examples at the 100th cycle was 94.6% on average. Thus, Experimental Examples exhibited values approximately 1.44 times and approximately 1.53 times better than the capacity and the capacity retention, respectively, of Comparative Example (112 mAh/g and 62%). Thus, the present invention can provide a lithium secondary battery having a large discharge capacity and good charge-discharge cycle performance by allowing the electrolyte to contain the salen-based metal complex as an additive. The present invention is not limited by the embodiments described above, and various changes or modifications can be made in the present invention without departing from the scope of the present invention.

INDUSTRIAL APPLICABILITY

According to the present embodiment, a lithium secondary battery having a high capacity and a long life can be produced and can be utilized as a power source for various electronic devices, automobiles, etc.

REFERENCE SIGNS LIST

10: Positive electrode
20: Electrolyte
30: Negative electrode
41 and 42: Current collector
50: Housing
100: Lithium secondary battery

The invention claimed is:

1. A lithium secondary battery comprising:
   a positive electrode comprising a material capable of intercalation and deintercalation of a lithium ion;
   a lithium ion-conductive electrolyte comprising a salen-based metal complex, wherein the salen-based metal complex is selected from
   (R,R)-(−)-N,N'-bis(3,5-di-tert-butylsalicylidene)-1,2-cyclohexanediaminotitanium chloride; (R,R)-(−)-N,N'-bis(3,5-di-tert-butylsalicylidene)-1,2-cyclohexanediaminovanadium chloride; (R,R)-(−)-N,N'-bis(3,5-di-tert-butylsalicylidene)-1,2-cyclohexanediaminochromium chloride; (R,R)-(−)-N,N'-bis(3,5-di-tert-butylsalicylidene)-1,2-cyclohexanediaminomanganese chloride; (R,R)-(−)-N,N'-bis(3,5-di-tert-butylsalicylidene)-1,2-cyclohexanediaminoiron chloride; (R,R)-(−)-N,N'-bis(3,5-di-tert-butylsalicylidene)-1,2-cyclohexanediaminocobalt; or (R,R)-(−)-N,N'-bis(3,5-di-tert-butylsalicylidene)-1,2-cyclohexanediaminoruthenium chloride; and
   a negative electrode comprising a material capable of occlusion and release of a lithium metal or a lithium ion.

2. The lithium secondary battery according to claim 1, wherein the salen-based metal complex includes at least two of the:
   (R,R)-(−)-N,N'-bis(3,5-di-tert-butylsalicylidene)-1,2-cyclohexanediaminotitanium chloride; (R,R)-(−)-N,N'-bis(3,5-di-tert-butylsalicylidene)-1,2-cyclohexanediaminovanadium chloride; (R,R)-(−)-N,N'-bis(3,5-di-tert-butylsalicylidene)-1,2-cyclohexanediaminochromium chloride; (R,R)-(−)-N,N'-bis(3,5-di-tert-butylsalicylidene)-1,2-cyclohexanediaminomanganese chloride; (R,R)-(−)-N,N'-bis(3,5-di-tert-butylsalicylidene)-1,2-cyclohexanediaminoiron chloride; (R,R)-(−)-N,N'-bis(3,5-di-tert-butylsalicylidene)-1,2- cyclohexanediaminocobalt; or (R,R)-(−)-N,N'-bis(3,5-di-tert-butylsalicylidene)-1,2-cyclohexanediaminoruthenium chloride.

3. The lithium secondary battery according to claim 2, wherein the electrolyte comprises a lithium ion-conductive organic electrolyte solution.

4. The lithium secondary battery according to claim 2, wherein the electrolyte comprises a lithium ion-conductive gel polymer electrolyte.

5. The lithium secondary battery according to claim 2, wherein the electrolyte comprises a lithium ion-conductive solid electrolyte.

6. The lithium secondary battery according to claim 1, wherein the electrolyte comprises a lithium ion-conductive organic electrolyte solution.

7. The lithium secondary battery according to claim 1, wherein the electrolyte comprises a lithium ion-conductive gel polymer electrolyte.

8. The lithium secondary battery according to claim 1, wherein the electrolyte comprises a lithium ion-conductive solid electrolyte.

\* \* \* \* \*